United States Patent

Funahashi et al.

[11] Patent Number: 4,859,850
[45] Date of Patent: Aug. 22, 1989

[54] IRRADIATION FIELD RECOGNIZING METHOD, AND METHOD OF ADJUSTING IMAGE PROCESSING CONDITIONS USING THE SAME

[75] Inventors: Takeshi Funahashi; Masamitsu Ishida, both of Kanagawa, Japan

[73] Assignee: Fuji Photo Film Co., Ltd., Kanagawa, Japan

[21] Appl. No.: 143,100

[22] Filed: Jan. 12, 1988

[30] Foreign Application Priority Data

Jan. 12, 1987 [JP] Japan .................................. 62-4552
Jan. 12, 1987 [JP] Japan .................................. 62-4553
Jan. 12, 1987 [JP] Japan .................................. 62-4554

[51] Int. Cl.$^4$ .................................................. G03C 5/16
[52] U.S. Cl. ................................. 250/327.2; 250/484.1
[58] Field of Search ......................... 250/327.2, 484.1; 364/414; 358/282, 111; 382/51, 52, 54, 22, 48; 378/99

[56] References Cited

U.S. PATENT DOCUMENTS

| | | | |
|---|---|---|---|
| 4,183,013 | 1/1980 | Agrawala et al. | 382/22 |
| 4,231,097 | 10/1980 | Shibayama et al. | 364/414 |
| 4,258,264 | 3/1981 | Kotera et al. | 250/484.1 |
| 4,276,473 | 6/1981 | Kato et al. | 250/327.2 |
| 4,527,060 | 7/1985 | Suzuki et al. | 250/327.2 |
| 4,682,028 | 7/1987 | Tanaka et al. | 250/327.2 |

FOREIGN PATENT DOCUMENTS

| | | | |
|---|---|---|---|
| 11395 | 2/1981 | Japan | 250/327.2 |
| 0099570 | 6/1984 | Japan | 382/62 |

Primary Examiner—Janice A. Howell
Assistant Examiner—Richard Hanig
Attorney, Agent, or Firm—Sughrue, Mion, Zinn, Macpeak & Seas

[57] ABSTRACT

In a method of recognizing an irradiation field, sample image signals at a picture element string extending from an edge of a recording region towards the center thereof are extracted from image signals detected from a recording medium. Changes among image density levels represented by the sample image signals are expressed by an approximate equation, and differences between imaginary density levels calculated by the approximate equation and actual density levels are calculated to find an edge of the irradiation field. Or, intersections of lines represented by approximate equations for picture element groups and a density change curve in a range higher than a predetermined density and represented by the sample image signals are detected, and the intersection nearest to the edge of the recording region is recognized as the edge of the irradiation field. Image processing conditions are adjusted based on the image signals inside of the recognized irradiation field.

21 Claims, 5 Drawing Sheets

IRRADIATION FIELD RECOGNIZING METHOD, AND METHOD OF ADJUSTING IMAGE PROCESSING CONDITIONS USING THE SAME

BACKGROUND OF THE INVENTION

1. Field of the Invention

This invention relates to a method of recognizing an irradiation field in the case where a radiation image is recorded on a recording medium such as a stimulable phosphor sheet by limitation of the irradiation field of a radiation. This invention also relates to a method of adjusting image processing conditions by utilization of the method of recognizing an irradiation field in the course of processing of image signals detected from the recording medium.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhbiting such properties is referred to as a stimulable phosphor.

As disclosed in U.S. Pat. No. 4,258,264 and Japanese Unexamined Patent Publication No. 56(1981)-11395, it has been proposed that a stimulable phosphor in a radiation image recording and reproducing system be used. Specifically, a sheet provided with a layer of the stimulable phosphor (hereinafter referred to as a stimulable phosphor sheet) is first exposed to a radiation passing through an object such as the human body to have a radiation image of the object stored thereon, and is then exposed to stimulating rays such as a laser beam which cause the stimulable phosphor sheet to emit light in proportion to the stored radiation energy. The light emitted by the stimulable phosphor sheet upon stimulation thereof is photoelectrically detected and converted to electric image signals, image processing is carried out on the electric image signals, and the radiation image of the object is reproduced as a visible image by use of the processed image signals on a recording material such as a photographic film, a display device such as a cathode ray tube (CRT), or the like.

In the aforesaid radiation image recording and reproducing system, in order to improve the image quality, particularly the diagnostic efficiency and accuracy, of the visible image, image read-out for photoelectrically detecting the light emitted by the stimulable phosphor sheet upon stimulation thereof should preferably be carried out by use of read-out conditions adjusted to appropriate values in accordance with each radiation image. From this viewpoint, one embodiment of the aforesaid radiation image recording and reproducing system has been proposed in, for example, Japanese Unexamined Patent Publication No. 58(1983)-67240. In the proposed embodiment, before final read-out is carried out by scanning the stimulable phosphor sheet carrying a radiation image of an object stored thereon by stimulating rays which cause the stimulable phosphor sheet to emit light in proportion to the radiation energy stored, detecting the emitted light by a photoelectric read-out means and converting it into electric image signals, preliminary read-out for approximately detecting the image information stored on the stimulable phosphor sheet is carried out by use of stimulating rays of a level lower than the level of the stimulating rays used in the final read-out. Read-out conditions for the final read-out are adjusted on the basis of the image signals obtained by the preliminary read-out, and the final read-out is carried out by use of the read-out conditions. The electric image signals obtained by the final read-out are sent to an image processing means and are processed in accordance with the image recording portion of the object and/or the image recording method to obtain a visible image suitable for viewing, particularly for diagnostic purposes. The processed image signals are used to reproduce the visible image on a photographic film or the like.

By the term "read-out conditions" as used herein are meant various conditions affecting the relationship between the input to the read-out means and the output thereof, for example, the relationship between the input to the photoelectric read-out means (i.e. the amount of the light emitted by the stimulable phosphor sheet) and the output thereof (i.e. the level of the electric image signal) in the aforesaid case. For example, the term "read-out conditions" means the read-out gain (sensitivity) determining the relationship between the input and the output of the read-out means, the scale factor (latitude), and the power of the stimulating rays used for read-out.

As mentioned above, the level of the stimulating rays used in the preliminary read-out is adjusted to be lower than the level of the stimulating rays used in the final read-out. That is, the effective energy of the stimulating rays which the stimulable phosphor sheet receives per unit area in the preliminary read-out is adjusted to be lower than the effective energy of the stimulating rays used in the final read-out.

In the case where the image information stored on the stimulable phosphor sheet is approximately ascertained prior to the final read-out and the final read-out is carried out by use of the read-out conditions adjusted on the basis of the image information, it becomes possible to eliminate adverse effects of a fluctuation in the level of the radiation energy stored on the stimulable phosphor sheet, which is caused by a change in the object or the image recording portion thereof, by a fluctuation in the radiation dose, or the like, and to obtain a visible image suitable for viewing, particularly for diagnostic purposes.

On the other hand, in the case where the aforesaid radiation image recording and reproducing system is used for medical diagnosis, portions of the human body not related to diagnosis should not be exposed to radiation since the radiation is harmful to the human body. Further, when the human body portions not related to diagnosis are exposed to radiation, the radiation is scattered by such portions to the portion related to the diagnosis, and the contrast and resolution are adversely affected by the scattered radiation. Therefore, in the aforesaid radiation image recording and reproducing system, the irradiation field is often limited in the course of the recording of a radiation image.

In the case where image recording is carried out by limiting the irradiation field as mentioned above, a portion inside of the irradiation field and a portion outside of the irradiation field are present on a single stimulable phosphor sheet. In this case, it is advantageous for the portion inside of the irradiation field, i.e. the position of the irradiation field contour, to be distinguishable.

This is because, in the case where the preliminary read-out is carried out on the stimulable phosphor sheet and the read-out conditions for the final read-out are to be adjusted on the basis, for example, of the image signals obtained by the preliminary read-out, the read-out conditions should preferably be adjusted on the basis of only the preliminary read-out image signals inside of the irradiation field on the stimulable phosphor sheet when image recording has been carried out by limitation of the irradiation field.

The aforesaid reason will hereinbelow be described in detail. As for the method of adjusting the read-out conditions for the final read-out on the basis of the image signals obtained by the preliminary read-out, a novel method has been proposed in, for example, Japaneses Unexamined Patent Publication No. 60(1985)-156055. The proposed method comprises the steps of: determining a histogram of levels of the image signals obtained by the preliminary read-out, calculating the maximum image signal level Pmax and the minimum image signal level Pmin of a desired image signal range in the histogram, and adjusting the read-out conditions for the final read-out so that the maximum image signal level Pmax and the minimum image signal level Pmin correspond respectively to the maximum signal level Qmax and the minimum signal level Qmin of a desired input signal range in an image processing means which are determined by the maximum density Dmax and the minimum density Dmin of a correct density range in the reproduced visible image.

However, in the case where image recording is carried out by limitation of the irradiation field as mentioned above, radiation scattered by the object within the irradiation field normally passes outside of the irradiation field. The scattered radiation is absorbed and stored on the stimulable phosphor sheet which exhibits high sensitivity, and therefore the histogram of the levels of the image signals obtained by the preliminary read-out includes the image signal level caused by the scattered radiation. Since the image signal level caused by the scattered radiation outside of the irradiation field on the stimulable phosphor sheet is often higher than the image signal level inside of the irradiation field, it is not always possible to discriminate between the image signal levels inside and outside of the irradiation field in the histogram obtained by the preliminary read-out. Therefore, in the case where Pmax and Pmin are calculated from the histogram as mentioned above and the read-out conditions are adjusted on the basis of Pmax and Pmin, the minimum image signal level inside of the irradiation field is not detected as Pmin, and that caused by the scattered radiation outside of the irradiation field is detected as Pmin. In general, the minimum image signal level outside of the irradiation field is lower than that inside of the irradiation field. Accordingly, when the minimum image signal level outside of the irradiation field is detected as Pmin, signals caused by the scattered radiation not related to diagnosis are taken within a low density range in the final read-out, and the density of the image of the portion related to diagnosis becomes too high. As a result, the image contrast decreases and it becomes difficult to make an accurate diagnosis.

More specifically, in the case where a radiation image is recorded by limiting the irradiation field, radiation scattered by the object passes outside of the irradiation field on the stimulable phosphor sheet and causes noise in the image signals obtained by the preliminary read-out. Therefore, when the read-out conditions are adjusted based on such preliminary read-out image signals, it is not always possible to adjust the read-out conditions to appropriate values and to obtain a visible image suitable for viewing, particularly for diagnostic purposes.

Therefore, in the case where radiation image recording is carried out by limiting the irradiation field and the read-out conditions are to be adjusted based on the preliminary read-out image signals by use of the aforesaid method, the irradiation field should be recognized accurately and the read-out conditions should be adjusted based on the preliminary read-out image signals inside of the irradiation field, thereby to eliminate adverse effects of the scattered radiation outside of the irradiation field.

Besides the case wherein the read-out conditions are to be adjusted for a radiation image stored on the stimulable phosphor sheet, recognition of the irradiation field is also necessary for various purposes in the case where a radiation image is recorded on a recording medium by limitation of the irradiation field.

On the other hand, in the aforesaid radiation image recording and reproducing system, image processing is carried ut as mentioned above on the image signals detected by image read-out. In general, the image processing is carried out by use of image processing conditions adjusted for each image in accordance with the image recording portion of the object and/or the image recording method to obtain a visible image suitable for viewing, particularly for diagnostic purposes. However, it may be considered preferable to adjust the image processing conditions on the basis of the image signals obtained, for example, by the preliminary read-out or the final read-out, instead of the image recording portion of the object and/or the image recording method, or on the basis of both the image signals obtained by the preliminary read-out or the final read-out and the image recording portion of the object and/or the image recording method.

However, as mentioned above, in the case where image recording is carried out by limiting the irradiation field, information (noise) caused by the scattered radiation outside of the irradiation field is contained in the image signals obtained by the preliminary read-out or the final read-out. Therefore, in this case, it is not always possible to obtain such appropriate image processing conditions as originally expected by the adjustment based on the image signals, even though the image processing conditions are adjusted on the basis of the image signals obtained by the preliminary read-out or the final read-out.

Therefore, in the case where image recording is carried out by limiting the irradiation field and the image processing conditions are to be adjusted based on the image signals as mentioned above, the image processing conditions should preferably be adjusted based on noise-free image signals obtained by eliminating the information caused by the scattered radiation, instead of being adjusted directly based on the detected image signals.

Besides the case of image recording utilizing the stimulable phosphor sheet, the aforesaid problems with regard to the adjustment of the image processing conditions arise generally in the case where a radiation image is recorded on a recording medium by limitation of the irradiation field.

By the term "image processing conditions" as used herein are meant various conditions affecting the relationship between the input to the image processing means and the output thereof, for example gradation processing conditions and frequency response processing conditions.

SUMMARY OF THE INVENTION

The primary object of the present invention is to provide a method of recognizing an irradiation field in the case where a radiation image is recorded on a recording medium such as a stimulable phosphor sheet by limiting the irradiation field.

Another object of the present invention is to provide a method of adjusting image processing conditions based on noise-free image signals obtained by eliminating the information caused by scattered radiation outside of the irradiation field in the case where a radiation image is recorded on a recording medium such as a stimulable phosphor sheet by limiting the irradiation field.

The present invention provides a first method of recognizing an irradiation field wherein an irradiation field is recognized in the case where a radiation image is recorded on a recording medium by limitation of the irradiation field, the method of recognizing an irradiation field comprising the steps of:

(i) extracting sample image signals at an arbitrary picture element string, which extends from an edge of a recording region on said recording medium towards the center of said recording region, from image signals detected from said recording medium, (ii) expressing changes among image density levels at a predetermined number of picture elements in the vicinity of said edge of said recording region, which image density levels are represented by said sample image signals, by an approximate equation substantially constituted by a simple equation, (iii) calculating differences between imaginary image density levels calculated by use of said approximate equation and actual image density levels represented by said sample image signals, and (iv) recognizing a region extending up to a picture element, at which said difference comes up to a predetermined value, from said edge of said recording region towards the center of said recording region as a region outside of the irradiation field, and recognizing a region inward from said picture element as viewed in the direction from said edge of said recording region towards the center of said recording region as the irradiation field.

The present invention also provides a first method of adjusting image processing conditions in the case where image signals detected from a recording medium carrying a radiation image stored thereon by limitation of an irradiation field are processed, the method of adjusting image processing conditions comprising the steps of:

(i) extracting sample image signals at an arbitrary picture element string, which extends from an edge of a recording region on said recording medium towards the center of said recording region, from image signals detected from said recording medium, (ii) expressing changes among image density levels at a predetermined number of picture elements in the vicinity of said edge of said recording regin, which image density levels are represented by said sample image signals, by an approximate equation substantially constituted by a simple equation, (iii) calculating differences between imaginary image density levels calculated by use of said approximate equation and actual image density levels represented by said sample image signals, (iv) recognizing a region extending up to a picture element, at which said difference comes up to a predetermined value, from said edge of said recording region towards the center of said recording region as a region outside of the irradiation field, and recognizing a region inward from said picture element as viewed in the direction from said edge of said recording region towards the center of said recording region as the irradiation field, and (v) adjusting said image processing conditions on the basis of the image signals inside of said recognized irradiation field in said image signals detected from said recording medium.

The present invention further provides a second method of recognizing an irradiation field wherein an irradiation field is recognized in the case where a radiation image is recorded on a recording medium by limitation of the irradiation field, the method of recognizing an irradiation field comprising the steps of:

(i) extracting sample image signals at an arbitrary picture element string, which extends from an edge of a recording region on said recording medium towards the center of said recording region, from image signals detected from said recording medium, (ii) expressing changes among image density levels represented by said sample image signals by approximate equations F1, F2, F3, . . . , Fn, which are substantially constituted by a simple equation, respectively for picture element groups L1, L2, L3, . . . , Ln divided sequentially in a direction from said edge of said recording region towards the center of said recording region, (iii) calculating differences between imaginary image density levels calculated by use of said approximate equations Fi and Fi-1 respectively within a range of a picture element group Li wherein $2 \leq i \leq n$, and (iv) recognizing a region extending up to a picture element, at which said difference comes up to a predetermined value, from said edge of said recording region towards the center of said recording region as a region outside of the irradiation field, and recognizing a region inward from said picture element as viewed in the direction from said edge of said recording region towards the center of said recording region as the irradiation field.

The present invention still further provides a second method of adjusting image processing conditions in the case where image signals detected from a recording medium carrying a radiation image stored thereon by limitation of an irradiation field are processed, the method of adjusting image processing conditions comprising the steps of:

(i) extracting sample image signals at an arbitrary picture element string, which extends from an edge of a recording region on said recording medium towards the center of said recording region, from image signals detected from said recording medium, (ii) expressing changes among image density levels represented by said sample image signals by approximate equations F1, F2, F3, . . . , Fn, which are substantially constituted by a simple equation for picture element groups L1, L2, L3, . . . , Ln respectively, divided sequentially in a direction from said edge of said recording region towards the center of said recording region, (iii) calculating differences between imaginary image density levels calculated by use of said approximate equations Fi and Fi-1 respectively within a range of a picture element group Li wherein $2 \leq i \leq n$, (iv) recognizing a region extending up to a picture element, at which said difference comes up to a predetermined value, from said edge of said recording region towards the center of said recording region as a region outside of the irradiation field, and recognizing a region inward from said picture element as viewed in the direction from said edge of said recording region towards the center of said recording region as the irradiation field, and (v) adjusting said image processing conditions on the basis of the image signals inside of said recognized irradiation field in said image signals detected from said recording medium.

The present invention also provides a third method of recognizing an irradiation field wherein an irradiation field is recognized in the case where a radiation image is recorded on a recording medium by limitation of the irradiation field, the method of recognizing an irradiation field comprising the steps of:

(i) extracting sample image signals at an arbitrary picture element string, which extends from an edge of a recording region on said recording medium towards the center of said recording region, from image signals detected from said recording medium, (ii) expressing changes among image density levels represented by said sample image signals by approximate equations F1, F2, F3, ..., Fn, which are substantially constituted by a simple equation for picture element groups L1, L2, L3, ..., Ln respectively, divided sequentially in a direction from said edge of said recording region towards the center of said recording region, and (iii) expressing intersecting points of straight lines represented by said approximate equations F1, F2, F3, ..., Fn and an image density change curve in a range higher than a predetermined density level, which is represented by said sample image signals as P1, P2, P3, ..., Pn respectively, and recognizing a region on a sheet center side with respect to the intersecting point nearest to said edge of said recording region among said intersecting points P1, P2, P3, ..., Pn as the irradiation field.

The present invention further provides a third method of adjusting image processing conditions in the case where image signals detected from a recording medium carrying a radiation image stored thereon by limitation of an irradiation field are processed, the method of adjusting image processing conditions comprising the steps of:

(i) extracting sample image signals at an arbitrary picture element string, which extends from an edge of a recording region on said recording medium towards the center of said recording region, from image signals detected from said recording medium, (ii) expressing changes among image density levels represented by said sample image signals by approximate equations F1, F2, F3, ..., Fn, which are substantially constituted by a simple equation for picture element groups L1, L2, L3, ..., Ln respectively, divided sequentially in a direction from said edge of said recording region towards the center of said recording region, (iii) expressing intersecting points of straight lines represented by said approximate equations F1, F2, F3, ..., Fn and an image density change curve in a range higher than a predetermined density level, which is represented by said sample image signals as P1, P2, P3, ..., Pn respectively, and recognizing a region on a sheet center side with respect to the intersecting point nearest to said edge of said recording region among said intersecting points P1, P2, P3, ..., Pn as the irradiation field, and (iv) adjusting said image processing conditions on the basis of the image signals inside of said recognized irradiation field in said image signals detected from said recording medium.

By the term "recording medium" as used herein is meant a medium capable of recording a radiation image thereon, such as a stimulable phosphor sheet. However, the recording medium is not limited to the stimulable phosphor sheet.

By the term "image signals detected from a recording medium" are meant the image signals detected by reading out a radiation image recorded on a recording medium by any method, for example the image signals detected by the preliminary read-out or the final read-out from the stimulable phosphor sheet. However, said image signals are not limited to the image signals detected in this manner from the stimulable phosphor sheet.

Of course, the method of utilizing the irradiation field recognized in accordance with the present invention is not limited to a particular one.

Also, in the first, second and third methods of adjusting image processing conditions in accordance with the present invention, the image signals utilized for recognition of the irradiation field and the image signals utilized for adjustment of the image processing conditions may be identical or different from each other. For example, the irradiation field may be recognized based on the final read-out image signals, and the image processing conditions may be adjusted based on the final read-out image signals inside of the irradiation field. Or, the irradiation field may be recognized based on the preliminary read-out image signals, and the image processing conditions may be adjusted based on the preliminary read-out image signals or the final read-out image signals inside of the irradiation field.

Adjustment of the image processing conditions on the basis of the image signals inside of the irradiation field embraces the case wherein the adjustment is carried out based on only the image signals inside of the irradiation field and the case wherein the adjustment is carried out based on the image signals inside of the irradiation field and the other factors such as the image recording portion of the object and/or the image recording method.

Also, adjustment of the image processing conditions may be carried out in any manner insofar as the adjustment is effected on the basis of the image signals inside of the irradiation field, i.e. by the utilization of said image signals.

The image processing conditions may typically be gradation processing conditions, but are not limited thereto.

As mentioned above, with the first method of recognizing an irradiation field in accordance with the present invention, sample image signals at an arbitrary picture element string extending from an edge of a recording region on the recording medium towards the center thereof are extracted. Changes among image density levels at a predetermined number of picture elements in the vicinity of the edge of the recording region, which image density levels are represented by the sample image signals, are expressed by an approximate equation substantially constituted by a simple equation. Differences between imaginary image density levels calculated by use of the approximate equation and actual image density levels represented by the sample image signals are calculated. Then, a region extending up to a picture element, at which the difference comes up to a predetermined value, from the edge of the recording region towards the center thereof is recognized as a region outside of the irradiation field, and a region inward from said picture element as viewed in the direction from the edge of the recording region towards the center thereof is recognized as the irradiation field.

In general, the levels of image density which the sample image signals extracted in the manner as mentioned above represent are comparatively high inside of the irradiation field, and change in accordance with the image. The image density becomes lower in the region outside of the irradiation field than in the region inside of the irradiation field. Radiation scattered by an object impinges also upon the region outside of the irradiation field, and the amount of the scattered radiation decreases gradually from the edge of the irradiation field toward the edge of the recording region. Therefore, in the region outside of the irradiation field, the image density increases towards the irradiation field in such a way that it increases comparatively moderately and linearly in the vicinity of the edge of the recording region and increases sharply near the irradiation field.

Accordingly, changes in image density in the vicinity of the edge of the recording region are approximately represented by a substantially simple equation, i.e. an equation representing a straight line, on the basis of the sample image signals, and differences between imaginary image density levels calculated by use of the approximate equation and actual image density levels represented by the sample image signals are calculated. The difference value thus calculated increases towards the center side, i.e. towards the irradiation field, and comes to exceed a predetermined density difference $\delta$ at an edge portion of the irradiation field. Therefore, when such a density difference $\delta$ is determined in advance experimentally, a region extending up to a picture element, at which the difference comes up to the predetermined value $\delta$, from the edge of the recording region towards the center of the recording region can be recognized as the region outside of the irradiation field, and a region inward from said picture element as viewed in the direction from the edge of the recording region towards the center of the recording region can be recognized as the irradiation field.

Therefore, with the first method of recognizing an irradiation field in accordance with the present invention, the irradiation field can be recognized accurately.

With the first method of adjusting image processing conditions in accordance with the present invention, the irradiation field is recognized by use of the aforesaid first method of recognizing an irradiation field in accordance with the present invention, and the image processing conditions are adjusted based on the image signals inside of the recognized irradiation field.

In the case where the irradiation field is detected and only the image signals inside of the irradiation field are extracted, the image signals thus extracted represent the true image signals obtained by removing the image signals caused by scattered radiation outside of the irradiation field from the image signals detected from the overall area of the recording medium, i.e. the true image signals free from noise caused by scattered radiation.

Therefore, with the first method of adjusting image processing conditions in accordance with the present invention, the adjustment of the image processing conditions can be effected based on the true image signals free from noise caused by scattered radiation, and consequently the image processing conditions can be adjusted to more appropriate values.

With the second method of recognizing an irradiation field in accordance with the present invention, image density changes in picture element groups L1, L2, L3, . . ., Ln divided sequentially in a direction from the edge of the recording region towards the center thereof and each comprising a predetermined N number of picture elements in the sample image signals are expressed by approximate equations F1, F2, F3, . . . , Fn respectively constituted by, for example, a simple equation $y = ax + b$, by use of a known method. Then, within a range of a picture element group Li wherein $2 \leq i \leq n$, differences $\Delta d$ between imaginary image density levels calculated respectively by use of the approximate equations Fi and Fi-1 are calculated. In the region outside of the irradiation field, the difference $\Delta d$ thus calculated is larger at a picture element on the side closer to the center of the recording region in each picture element group Li, and the degree of increase of $\Delta d$ in each picture element group Li becomes larger in a group on the side closer to the center of the recording region. The difference $\Delta d$ comes to exceed a predetermined density difference $\delta$ at a picture element XO at an edge portion of the irradiation field. Therefore, when such a density difference $\delta$ is determined in advance experimentally, the picture element XO at which the density difference $\Delta d$ comes to exceed the predetermined density difference $\delta$ can be recognized as an irradiation field edge picture element.

Therefore, with the second method of recognizing an irradiation field wherein the region up to the picture element at which the density difference $\Delta d$ comes up to the predetermined value $\delta$ is recognized as the region outside of the irradiation field and a region inward from said picture element as viewed in the direction from the edge of the recording region towards the center thereof is recognized as the irradiation field, the irradiation field can be recognized accurately.

With the second method of adjusting image processing conditions in accordance with the present invention, the irradiation field is recognized by use of the aforesaid second method of recognizing an irradiation field in accordance with the present invention, and the image processing conditions are adjusted based on the image signals inside of the recognized irradiation field. Accordingly, the same effects as with the first method of adjusting image processing conditions in accordance with the present invention can be obtained.

With the third method of recognizing an irradiation field in accordance with the present invention, sample image signals at an arbitrary picture element string, which extends from an edge of a recording region on the recording medium towards the center of the recording region are extracted, and changes among image density levels represented by the sample image signals are expressed by approximate equations F1, F2, F3, . . . , Fn, which are substantially constituted by a simple equation for picture element groups L1, L2, L3, . . . , Ln respectively, divided sequentially in a direction from the edge of the recording region towards the center thereof. In the case where intersecting points of straight lines represented by the approximate equations F1, F2, F3, ..., Fn and an image density change curve in a range higher than a predetermined density level, which is represented by the sample image signals, are expressed as P1, P2, P3, ..., Pn respectively, a region on a sheet center side with respect to the intersecting point nearest to the edge of the recording region among the intersecting points P1, P2, P3, ..., Pn is recognized as the irradiation field.

In the region outside of the irradiation field, the image density increases sharply in the form approximately convex toward the low density side in the vicinity of the irradiation field. Therefore, in the case where image density changes in picture element groups L1, L2, L3, ..., Ln divided sequentially in a direction from the edge of the recording region towards the center thereof and each comprising a predetermined N number of picture elements in the sample image signals are expressed by approximate equations F1, F2, F3, ..., Fn respectively, constituted by, for example, a simple equation $y = ax + b$, by use of a known method and the intersecting points P1, P2, P3, ..., Pn of straight lines represented by the approximate equations F1, F2, F3, ..., Fn and an image density change curve in a range higher than a predetermined density level dT, which is represented by the sample image signals, are found, the intersecting points P1, P2, P3, ..., Pn thus found represent the intersecting points of the straight lines represented by the approximate equations F1, F2, F3, ..., Fn and the portion of the image density change curve that represents the image inside of the irradiation field. Also, the picture element XO corresponding to the intersecting point nearest to the edge of the recording region among the intersecting points P1, P2, P3, ..., Pn can be regarded as the picture element present at the edge portion of the irradiation field. Therefore, in the case where the predetermined density dT is selected in advance experimentally so that the intersecting points P1, P2, P3, ..., Pn are positioned at the portion of the image density change curve that represents the image inside of the irradiation field, instead of being positioned at the portion of the image density change curve in the vicinity of the edge of the recording region that represents the levels of the scattered radiation, the region inward from (i.e. on the center side with respect to) the intersecting point nearest to the edge of the recording region among the aforesaid intersecting points can be recognized as the irradiation field by use of the predetermined density dT.

Therefore, with the third method of recognizing an irradiation field, the irradiation field can be recognized accurately.

With the third method of adjusting image processing conditions in accordance with the present invention, the irradiation field is recognized by use of the aforesaid third method of recognizing an irradiation field in accordance with the present invention, and the image processing conditions are adjusted based on the image signals inside of the recognized irradiation field. Accordingly, the same effects as with the first method of adjusting image processing conditions in accordance with the present invention can be obtained.

DESCRIPTION OF THE PREFERRED EMBODIMENTS

The present invention will hereinbelow be descried in further detail with reference to the accompanying drawings.

First, an embodiment of the first method of recognizing an irradiation field in accordance with the present invention will be described below. The embodiment is for the case where an irradiation field is recognized on the basis of preliminary read-out image information detected from a stimulable phosphor sheet carrying a radiation image stored thereon by limitation of the irradiation field in a rectangular form.

Figure 1:
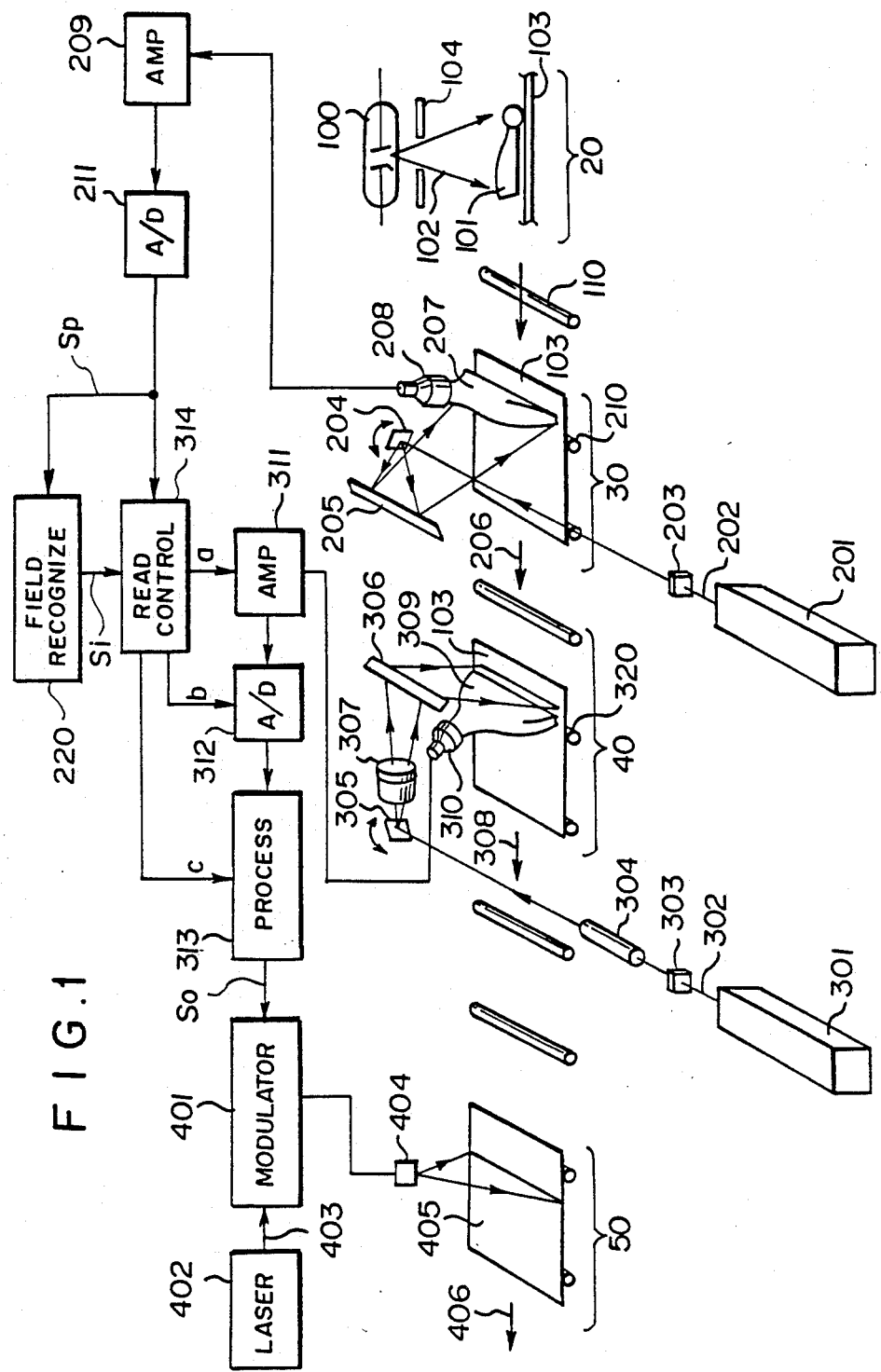
FIG. 1 is a schematic view showing the radiation image recording and reproducing system wherein an embodiment of the method of recognizing an irradiation field and an embodiment of the method of adjusting image processing conditions in accordance with the present invention are employed.

FIG. 1 shows an example of the radiation image recording and reproducing system provided with a process for recognizing the irradiation field in accordance with the present invention and constituted for utilizing the irradiation field recognized by the process for adjustment of read-out conditions and image processing conditions. The radiation image recording and reproducing system basically comprises a radiation image recording section 20, a preliminary read-out section 30, a final read-out section 40, and an image reproducing section 50. At the radiation image recording section 20, a radiation 102 is emitted by a radiation source 100 constituted by an X-ray tube or the like toward an object 101. A stimulable phosphor sheet 103 for storing radiation energy thereon is placed at the position exposed to the radiation 102 passing through the object 101, and a radiation image of the object 101 is stored on the stimulable phosphor sheet 103. An irradiation field stop 104 for limiting the irradiation field of the radiation 102 is disposed between the radiation source 100 and the object 101.

The stimulable phosphor sheet 103 carrying the radiation image of the object 101 stored thereon is sent to the preliminary read-out section 30 by a sheet conveyance means 110 constituted by a conveyor roller or the like. At the preliminary read-out section 30, a laser beam 202 emanated by a laser beam source 201 is first passed through a filter 203 for cutting off light having a wavelength within a range identical with the wavelength of the light emitted by the stimulable phosphor sheet 103 upon stimulation thereof by the laser beam 202. Then, the laser beam 202 is one-dimensionally deflected by a light deflector 204 such as a galvanometer mirror and directed onto the stimulable phosphor sheet 103 by a plane reflection mirror 205. The laser beam source 201 is selected so that the laser beam 202 emanated thereby has a wavelength distribution different from and far apart from the wavelength distribution of the light emitted by the stimulable phosphor sheet 103 upon stimulation thereof. While the laser beam 202 impinges upon the stimulable phosphor sheet 103, the stimulable phosphor sheet 103 is moved in the direction indicated by the arrow 206 (i.e. in the sub-scanning direction) by a sheet conveyance means 210 constituted by conveyor rollers or the like, and thus the overall surface of the stimulable phosphor sheet 103 is exposed to and scanned by the laser beam 202. The power of the laser beam source 201, the beam diameter of the laser abeam 202, the scanning speed of the laser beam 202, and the moving speed of the stimulable phosphor sheet 103 are selected so that the level of the stimulation energy of the laser beam 202 for preliminary read-out is lower than the level of the stimulation energy of the laser beam for the final read-out carried out at the final read-out section 40.

When exposed to the laser beam 202 as mentioned above, the stimulable phosphor sheet 103 emits light in proportion to the radiation energy stored thereon, and the emitted light enters a light guide member 207 which may be of a shape and a material as disclosed in U.S. Pat. No. 4,346,295. The light is guided inside of the light guide member 207 through total reflection, emanated from a light output face of the light guide member 207 and received by a photodetector 208 constituted by a photomultiplier or the like. The light receiving face of the photodetector 208 is closely contacted with a filter for transmitting only light having the wavelength distribution of the light emitted by the stimulable phosphor sheet 103 and cutting off the light having the wavelength distribution of the stimulating rays, so that the photodetector 208 can detect only the light emitted by the stimulable phosphor sheet 103 upon stimulation thereof. The light detected by the photodetector 208 is converted into electric signals (image signals) carrying the image information stored on the stimulable phosphor sheet 103, and amplified by an amplifier 209. The signals generated by the amplifier 209 are digitized by an A/D converter 211, and sent as preliminary read-out image signals Sp to a final read-out control circuit 314 at the final read-out section 40 and to an irradiation field recognizing circuit 220 which will be described later in detail. The final read-out control circuit 314 calculates a read-out gain (a), a scale factor (b), and image processing conditions (c) on the basis of the preliminary read-out image signals inside of an irradiation field recognized by the irradiation field recognizing circuit 220 among the preliminary read-out image signals Sp.

After the preliminary read-out is finished, the stimulable phosphor sheet 103 is sent to the final read-out section 40. At this section, a laser beam 302 emanated by a laser beam source 301 is first passed through a filter 303 for cutting off light having a wavelength within the range identical with the range of the wavelength of the light emitted by the stimulable phosphor sheet 103 upon stimulation thereof by the laser beam 302. Then, the beam diameter of the laser beam 302 is strictly adjusted by a beam expander 304. The laser beam 302 is then deflected by a light deflector 305 formed of a galvanometer mirror or the like, and is made to impinge upon the stimulable phosphor sheet 103 by a plane reflection mirror 306. Between the light deflector 305 and the plane reflection mirror 306 is disposed an $f\theta$ lens 307 for keeping the beam diameter of the laser beam 302 uniform in the course of the scanning of the laser beam 302 on the stimulable phosphor sheet 103. While the laser beam 302 impinges upon the stimulable phosphor sheet 103, the stimulable phosphor sheet 103 is moved in the direction indicated by the arrow 308 (i.e. in the sub-scanning direction) by a sheet conveyance means 320 constituted by conveyor rollers or the like and, consequently, the overall area of the stimulable phosphor sheet 103 is exposed to and scanned by the laser beam 302. Upon exposure to the laser beam 302, the stimulable phosphor sheet 103 emits light in proportion to the radiation energy stored thereon, and the light emitted enters a light guide member 309 which is made of the same material and has the same configuration as the light guide member 207 used for the preliminary read-out. The light emitted by the stimulable phosphor sheet 103 is guided inside of the light guide member 309 through total reflection, emanated from the light output face of the light guide member 309 and received by a photodetector 310 constituted by a photomultiplier or the like. The light receiving face of the photodetector 310 is put into close contact with a filter for selectively transmitting only the light having the wavelength distribution of the light emitted by the stimulable phosphor sheet 103, so that the photodetector 310 can detect only the light emitted thereby.

The output of the photodetector 310 photoelectrically detecting the light emission representing the radiation image stored on the stimulable phosphor sheet 103 is amplified to an appropriate level by an amplifier 311 on the basis of the read-out gain (a) calculated by the control circuit 314. The amplified electric signals are fed to an A/D converter 312 which converts the electric signals into digital signals of an appropriate signal level width on the basis of the scale factor (b) calculated by the control circuit 314. The digital signals thus obtained are fed to a signal processing circuit 313, in which they are subjected to signal processing (image processing) based on the image processing conditions (c) calculated by the control circuit 314 so as to obtain a visible radiation image suitable for viewing, particularly for diagnostic purposes, and are output as read-out image signals (final read-out image signals) So.

The final read-out image signals So generated by the signal processing circuit 313 are fed to a light modulator 401 at the image reproducing section 50. At the image reproducing section 50, a laser beam 403 emanated by a reproducing laser beam source 402 is modulated by the light modulator 401 on the basis of the final read-out image signals So received from the signal processing circuit 313, and is made to impinge upon a photosensitive material 405 such as a photographic film by a scanning mirror 404 for scanning the photosensitive material 405 by the laser beam 403. At this time, the photosensitive material 405 is moved normal to the aforesaid scanning direction, i.e. in the direction indicated by the arrow 406. Accordingly, the radiation image represented by the final read-out image signals So is recorded on the photosensitive material 405. For reproducing the radiation image, it is possible to use any other appropriate method such as the aforesaid display on a CRT.

Figure 2A:
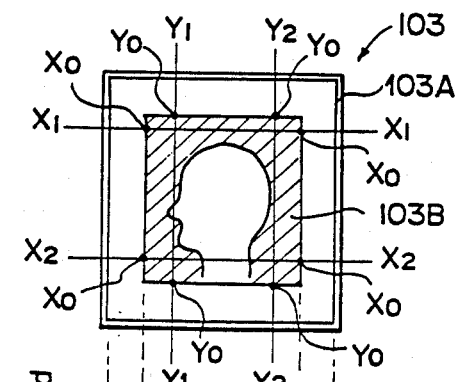
FIGS. 2A and 2B are explanatory views respectively showing examples of the irradiation field limiting condition on a stimulable phosphor sheet and changes in image density at a picture element string on the stimulable phosphor sheet in the radiation image recording and reproducing system shown in FIG. 1.

In the course of the recording of a radiation image on the stimulable phosphor sheet 103, the irradiation field stop 104 is operated to limit the irradiation field as shown in FIG. 2A. In this case, an irradiation field (a sheet portion where the image is recorded) 103B is formed at a part of a recording region 103A on the stimulable phosphor sheet 103. As mentioned above, the irradiation field recognizing circuit 220 recognizes the irradiation field 103B on the basis of the preliminary read-out image signals Sp, and sends signals St representing the irradiation field 103B to the control circuit 314. The control circuit 314 adjusts the read-out gain (a), the scale factor (b) and the image processing conditions (c) based on the preliminary read-out image signals Sp inside of the irradiation field 103B represented by the irradiation field signals St.

Figure 2B:
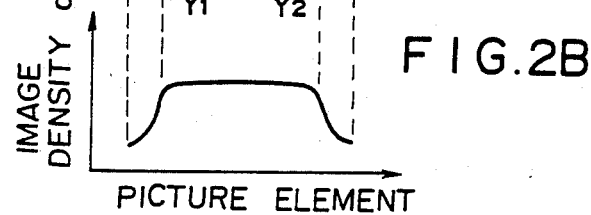
Figure 3:
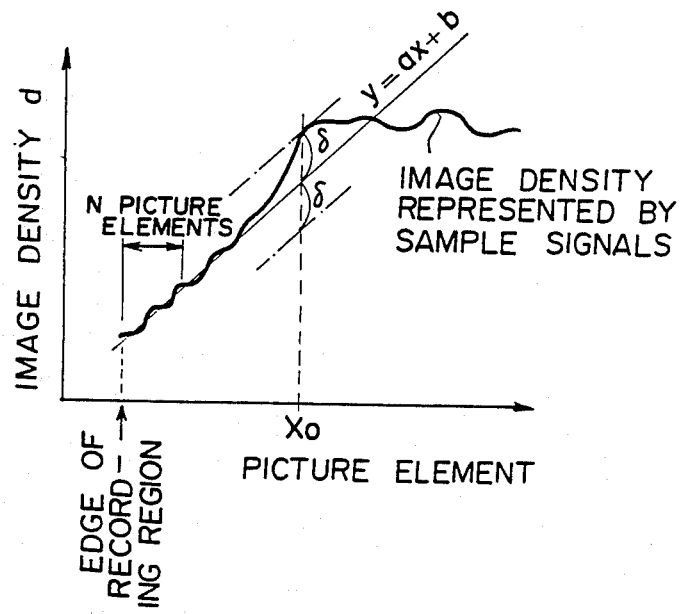
FIG. 3 is an explanatory graph showing recognition of the irradiation field in the embodiment of the first method of recognizing an irradiation field and in the embodiment of the first method of adjusting image processing conditions in accordance with the present invention.

Recognition of the irradiation field by the irradiation field recognizing circuit 220 will now be described in detail below. The irradiation field recognizing circuit 220 extracts sample image signals at an arbitrary picture element string extending from an edge of the recording region on the stimulable phosphor sheet 103 towards the center thereof as indicated by the line X1—X1 in FIG. 2A, for example at a picture element string in the main scanning direction, from the overall preliminary read-out image signals Sp received from the A/D converter 211. In general, changes in image density d represented by the sample image signals thus extracted become as shown in FIG. 2B. Specifically, in the region inside of the irradiation field 103B, the image density d is comparatively high and changes in accordance with the image stored on the stimulable phosphor sheet 103. In the region outward from the edge portion of the irradiation field 103B, i.e. in the region outside of the irradiation field, the image density d becomes lower than the image density inside of the irradiation field 103B. Since radiation scattered by the object impinges upon the region outside of the irradiation field and the amount of the scattered radiation decreases gradually from the edge portion of the irradiation field 103B towards the edge of the recording region on the stimulable phosphor sheet 103, the image density d in the region outside of the irradiation field changes as shown in FIG. 2B. FIG. 3 shows the changes in the image density d in the vicinity of the edge portion of the irradiation field 103B. As shown in FIG. 3, the image density d changes comparatively moderately and linearly in the vicinity of the edge of the recording region, and increases sharply near the irradiation field 103B.

As shown in FIG. 3, the irradiation field recognizing circuit 220 expresses the linear changes in the image density d among a predetermined N number of picture elements in the vicinity of the edge of the recording region 103A by an approximate equation constituted by a simple equation, for example, $y = ax + b$, by use of a known method. The approximate equation may also be any other equation of high order insofar as it substantially expresses a straight line.

Based on the approximate equation, the irradiation field recognizing circuit 220 then calculates the levels of imaginary image density d' at the respective picture elements of the picture element string, and calculates differences $|d-d'|$ between the levels of the actual image density d and the levels of the imaginary image density d' at the respective picture elements. Thereafter, the irradiation field recognizing circuit 220 compares the density differences $|d-d'|$ with a predetermined density difference δ, starting from the picture element on the edge side of the recording region 103A. The density difference $|d-d'|$ is small in the vicinity of the edge of the recording region 103A, and comes to exceed the predetermined density difference δ at a picture element XO at the edge portion of the irradiation field 103B. Therefore, the irradiation field recognizing circuit 220 recognizes the picture element XO, at which the density difference $|d-d'|$ comes to exceed the predetermined density difference δ for the first time in the aforesaid comparison, as an irradiation field edge picture element. The value suitable as the predetermined density difference δ may be selected experimentally. the aforesaid analysis is carried out also for the opposite edge portion of the recording region 103A, and irradiation field edge picture elements XO, XO as shown in FIG. 2A are detected for the picture element string X1—X1.

The irradiation field recognizing circuit 220 carries out the aforesaid analysis also for, for example, a picture element string X2—X2 parallel to the picture element string X1—X1, and picture element strings Y1—Y1 and Y2—Y2 which are normal to the picture element strings X1—X1 and X2—X2 as shown in FIG. 2A, and thereby detects other irradiation field edge picture elements XO and YO. The irradiation field recognizing circuit 220 recognizes the region outward from the irradiation field edge picture elements XO and YO as the region outside of the irradiation field, and the region inward from the irradiation field edge picture elements XO and YO as the irradiation field 103B, and sends the irradiation field signals St representing the irradiation field 103B to the control circuit 314 as mentioned above. The control circuit 314 adjusts the read-out gain (a), the scale factor (b) and the image processing conditons (c) based on the preliminary read-out image signals Sp inside of the irradiation field 103B represented by the irradiation field signals St. Therefore, the conditions thus adjusted are free from adverse effects of the image information stored in the region outside of the irradiation field, and become optimal for the radiation image actually stored inside of the irradiation field 103B.

The picture element strings at which the sample image signals are to be extracted are not limited to the two horizontal strings X1—X1, X2—X2 and the two vertical strings Y1—Y1, Y2—Y2 on the stimulable phosphor sheet 103 as shown in FIG. 2A. The method of extracting the sample image signals as shown in FIG. 2A is advantageous for the case where the shape of the irradiation field 103B is fixed to, for example, a square on the stimulable phosphor sheet 103, and the irradiation field recognizing circuit 220 is constituted to recognize the square irradiation field 103B. In the case where the shape of the irradiation field 103B is not fixed, extraction of the sample image signals should be carried out at many picture element strings positioned comparatively close to one another, and the region inward from a boundary line formed by connecting many irradiation field edge picture elements thus obtained should be recognized as the irradiation field. Therefore, the present invention is applicable also to the cases where irradiation field is limited to a shape different from a square, for example to a circular shape and to the cases where the orientation of the square irradiation field is unknown.

The present invention is also applicable to the cases of subdivision image recording wherein a single recording medium (a single stimulable phosphor sheet in the case of the aforesaid embodiment) is divided into a plurality of subdivisions and image recording is carried out at each subdivision. In such a case, the present invention may be applied by, for example, obtaining in advance the information on the subdivision image recording.

In the radiation image recording and reproducing system shown in FIG. 1, the preliminary read-out system and the final read-out system are disposed independently. However, as disclosed in, for example, Japanese Unexamined Patent Publication No. 58(1983)-67242, a single read-out system may be used for the preliminary read-out and the final read-out. In this case, after the preliminary read-out is finished, the stimulable phosphor sheet is returned to the read-out system by a sheet conveyance means and then the final read-out is carried out. In the preliminary read-out step, the stimulation energy of the stimulating rays is adjusted by a stimulating ray energy adjusting means to be lower than the stimulation energy of the stimulating rays used in the final read-out. The present invention can be employed also in such a radiation image recording and reproducing system.

The irradiation field recognized in the manner mentioned above may be utilized for various purposes. For example, the irradiation field can be utilized in the case where only the image signals inside of the irradiation field are extracted from the preliminary read-out image signals as mentioned above and the read-out conditions are adjusted based on the extracted image signals, and in the case where only the image signals inside of the irradiation field are extracted from the final read-out image signals and the image processing conditions are adjusted based on the extracted image signals as will be described below. Also, the irradiation field can be utilized in the case where only the image signals inside of the irradiation field are extracted from the preliminary read-out image signals and the image processing conditions are adjusted based on the extracted image signals. The irradiation field can also be utilized for other purposes, for example in the case where the irradiation field is recognized from the preliminary read-out image signals and the read-out region in the final read-out is limited to the region inside of the irradiation field as disclosed in, for example, Japanese Unexamined Patent Publication No. 60(9185)-120346. In the case where the read-out region in the final read-out is limited to the region inside of the irradiation field, noise components caused by scattered radiation and stored outside of the irradiation field on the stimulable phosphor sheet are not detected in the final read-out, and a final visible image having a high image quality can be obtained. Also, since the read-out region is limited, it becomes possible to shorten the read-out time or to increase the read-out density.

Besides the preliminary read-out image signals as in the aforesaid embodiment, recognition of the irradiation field in accordance with the present invention may be effected based on the other image signals, for example based on the final read-out image signals.

An embodiment of the first method of adjusting image processing conditions in accordance with the present invention will now be described below.

As mentioned above with reference to the radiation image recording and reproducing system shown in FIG. 1, the method of adjusting image processing conditions in accordance with the present invention is applicable also to the case where the irradiation field is recognized from the preliminary read-out image signals and the image processing conditions are adjusted based on the preliminary read-out image signals inside of the recognized irradiation field. However, the embodiment described below are for the case where the irradiation field is recognized on the basis of final read-out image signals, and gradation processing conditions as one of the kinds of image processing conditions are adjusted based on the final read-out image signals inside of the recognized irradiation field.

In this embodiment, the image signals are obtained by carrying out the final read-out on the stimulable phosphor sheet carrying a radiation image stored thereon by limitation of the irradiation field.

In order to obtain the image signals by carrying out the final read-out, the stimulable phosphor sheet is scanned with stimulating rays, and the light emitted by the stimulable phosphor sheet when scanned with stimulating rays is detected by a photoelectric read-out means. The image signals obtained by the final read-out mean the electric signals corresponding to light emission amounts at the respective scanning points, i.e. at the respective picture elements, on the stimulable phosphor sheet.

Then, sample image signals at an arbitrary picture element string extending from an edge of a recording region on the stimulable phosphor sheet towards the center thereof are extracted from the image signals obtained in the manner mentioned above. Changes among image density levels at a predetermined number of picture elements in the vicinity of the edge of the recording region, which image density levels are represented by the sample image signals, are expressed by an approximate equation substantially constituted by a simple equation. Differences between imaginary image density levels calculated by use of the approximate equation and actual image density levels represented by the sample image signals are calculated. Then, a region extending up to a picture element, at which the difference comes up to a predetermined value, from the edge of the recording region towards the center thereof is recognized as a region outside of the irradiation field, and a region inward from said picture element as viewed in the direction from the edge of the recording region towards the center thereof is recognized as the irradiation field.

The method of recognizing the irradiation field utilized in this embodiment is the same as the aforesaid first method of recognizing an irradiation field in accordance with the present invention.

Then, the gradation processing conditions are adjusted on the basis of the image signals inside of the recognized irradiation field in the final read-out image signals detected from the recording medium. The adjustment may be carried out in various manners, for example by the method described below.

Specifically, a method may be used comprising the steps of: determining a histogram of the final read-out image signals (image signal levels) inside of the irradiation field, calculating the maximum image signal level $P_{max}$ and the minimum image signal level $P_{min}$ of a desired image signal range in the histogram, and adjusting the gradation processing conditions so that the maximum image signal level Pmax and the minimum image signal level Pmin correspond to the maximum signal level Rmax and the minimum signal level Rmin, respectively of a desired input signal range in an image reproduction means which are determined by the maximum density Dmax and the minimum density Dmin of a correct density range in the reproduced visible image.

Figure 4:
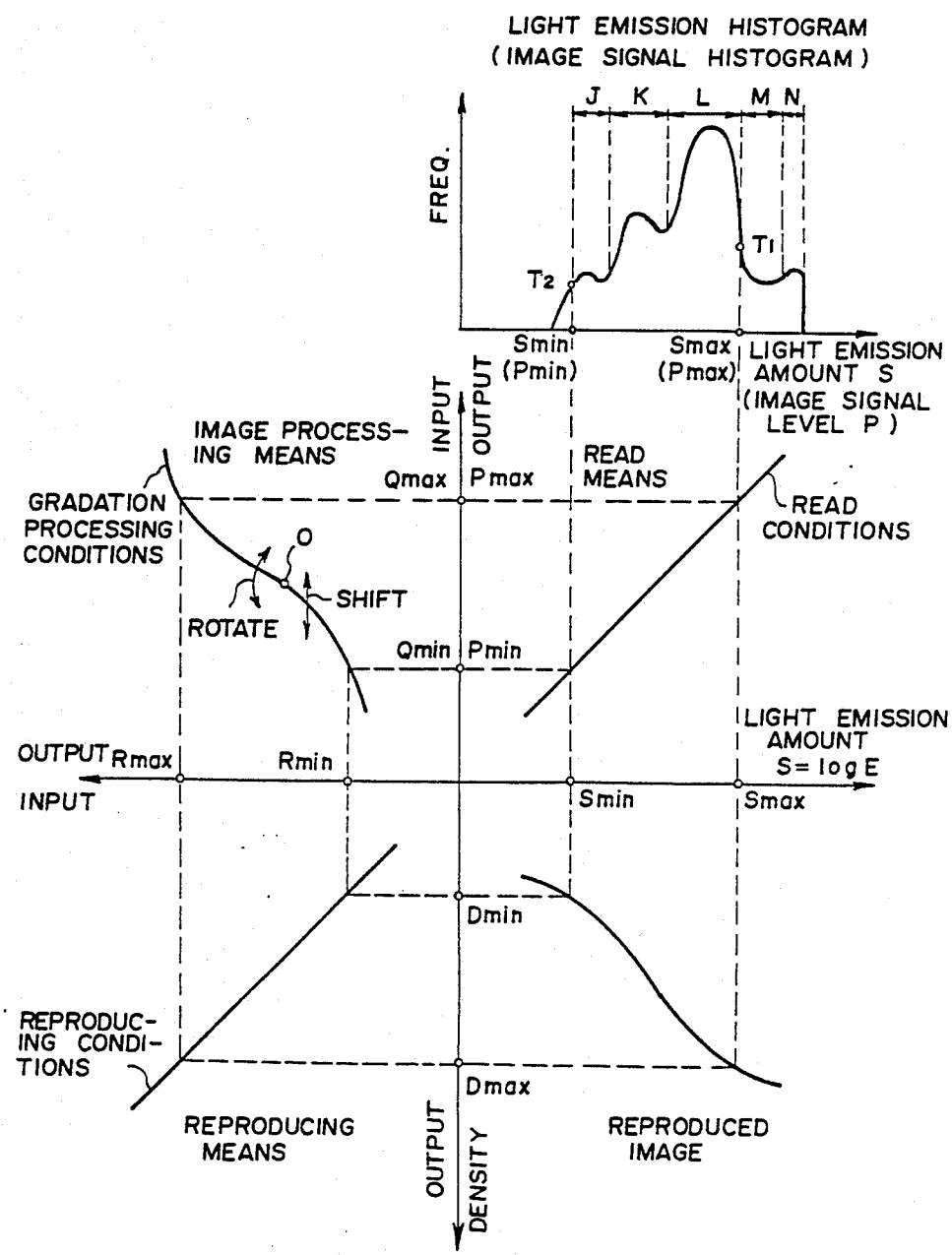
FIG. 4 is an explanatory graph showing an example of adjustment of gradation processing conditions in the embodiment of the first method of adjusting image processing conditions in accordance with the present invention.

The aforesaid method will hereinbelow be described in detail with reference to FIG. 4. In FIG. 4, instead of a histogram of electric image signals obtained by photoelectrically detecting the light emitted by the stimulable phosphor sheet by use of a photoelectric read-out means, a histogram of light emission amounts of the stimulable phosphor sheet prior to photoelectric detection thereof is shown. The light emission amounts are converted into electric image signals by use of fixed and linear read-out conditions as shown in FIG. 4. Therefore, the light emission amount and the image signal level have a proportional relationship to each other with a fixed constant of proportionality, and the histogram of the light emission amounts is substantially equivalent to the histogram of the image signals. Accordingly, in the following descriptions, the histogram of the light emission amounts as shown in FIG. 4 is regarded as the histogram of the image signals.

The image signals used for the creation of the histogram in this embodiment need not necessarily be the signals detected by use of the linear read-out conditions as mentioned above insofar as the image signals have some correspondent relationship with the light emission amounts, and may be the image signals detected by use of non-linear read-out conditions, for example.

Specifically, in this method, a histogram of the final read-out image signals inside of the irradiation field is created, and a desired image signal range (range of the amounts of the emitted light) is determined on the basis of the histogram. Since the pattern of the histogram is approximately fixed by the image recording portion of an object and/or the image recording method, the desired image signal range is determined from the histogram with reference to the image recording portion of an object and/or the image recording method. For example, in the case of chest image recording, the pattern of the histogram becomes as shown in FIG. 4, and it is possible to know that J in the histogram denotes the mediastinum, K denotes the heart, L denotes the lungs, M denotes the skin and the soft tissue, and N denotes the region outside of the object. Therefore, from the histogram, it is possible to calculate the maximum image signal level Pmax (i.e. the maximum light emission amount Smax) and the minimum image signal level Pmin (i.e. the minimum light emission amount Smin) defining the desired image signal range. For example, in the case where information on the skin and the soft tissue (M) and information on the region outside of the object (N) are unnecessary in FIG. 4, the desired image signal range becomes that from Pmax to Pmin including J, K and L as shown. The maximum image signal level Pmax and the minimum image signal level Pmin may be calculated by use of various methods from the histogram, for example by determining threshold values T1 and T2 in accordance with the desired image signal range and calculating Pmax and Pmin on the basis of T1 and T2.

On the other hand, in the radiation image recording and reproducing system, electric image signals are generally obtained from the light emitted by the stimulable phosphor sheet in proportion to the stored radiation energy by use of the photoelectric read-out means as mentioned above, and are subjected to various signal processings in an image processing means, particularly the gradation processing. The processed image signals are used to reproduce a visible image on a photographic film or the like by use of the image reproduction means. The reproduced visible image should have a correct density range suitable for viewing, particularly for diagnostic purposes. In general, the correct density range (Dmax to Dmin) is determined in advance. Also, image reproducing conditions in the image reproduction means (i.e. the conditions determining the relationship between the input to the image reproduction means and the output therefrom) are determined in advance. Therefore, the range of signal levels (Rmax to Rmin) which should be sent to the image reproduction means as suitable for obtaining the correct density range (Dmax to Dmin) is determined by the image reproducing conditions.

Accordingly, the gradation processing conditions in the gradation processing are adjusted so that the maximum image signal level Pmax and the minimum image signal level Pmin calculated in the manner mentioned above correspond to the maximum signal level Rmax and the minimum signal level Rmin determined in the manner mentioned above.

The gradation processing is carried out for converting the level of each image signal fed to an image processing means (a gradation processing means) by use of predetermined conditions. The predetermined conditions are referred to as the gradation processing conditions, and the gradation processing conditions are usually expressed by a non-linear gradation curve.

The purpose of the gradation processing is to obtain a visible reproduced image suitable for viewing, particularly for diagnostic purposes, in accordance with the image recording conditions, for example the image recording portion of the object such as the head or the chest, and/or the image recording method such as plain image recording or contrasted image recording. Therefore, in general, basic patterns of non-linear gradation processing conditions most suitable for the respective image recording conditions should preferably be determined in advance, one of the basic patterns of the gradation processing conditions should be selected in accordance with the image recording conditions of an image in the course of gradation processing of the image, and the gradation processing should be carried out by use of the selected basic pattern.

Also, in this embodiment, an appropriate basic pattern is selected from those of the gradation processing conditions predetermined in accordance with the image recording conditions of images. The gradation processing conditions which are to be used are adjusted by correcting the selected basic pattern on the basis of the image signals inside of the irradiation field, i.e. by, as shown in the second quadrant of FIG. 4, vertically shifting the selected basic pattern or rotating it around a predetermined center point O so that Pmax corresponds to Rmax or Pmin corresponds to Rmin.

Besides the non-linear gradation processing conditions determined by the image recording conditions as mentioned above, linear gradation processing conditions may be used in some cases. In such a case, the gradation processing conditions which are to be used are adjusted by rotating or shifting a single predetermined straight line in the manner mentioned above so that Pmax corresponds to Rmax or Pmin corresponds to Rmin. The adjustment of the gradation processing conditions by this method is carried out on the basis of only the image signals inside of the irradiation field, instead of on the basis of the image recording portion of the object and/or the image recording method.

In the case where the gradation processing of the image signals is carried out by use of the gradation processing conditions adjusted to appropriate values in accordance with each radiation image (image signals) stored on the stimulable phosphor sheet, it becomes possible to process the signals so that the necessary object image information is always expressed within the correct density range suitable for viewing, particularly for diagnostic purposes, in every reproduced visible image regardless of any fluctuation in the level of the radiation energy stored on the stimulable phosphor sheet, which is caused by changes in the object, the image recording portion thereof, radiation dose, or the like.

Also, in this case, the gradation processing conditions can be adjusted based on the image signals free from noise caused by scattered radiation in accordance with the present invention, and therefore, the desired image signal range can be determined more accurately from the image signal histogram. As a result, the effects of expressing the necessary object image information within the correct density range are enhanced markedly.

The method of adjusting the gradation processing conditions in the manner mentioned above is advantageous particularly in the case where the image signals detected by use of the read-out conditions adjusted without considering a fluctuation in the radiation energy level range recorded in each image recording as mentioned above are to be processed.

An embodiment of the second method of recognizing an irradiation field in accordance with the present invention will be described hereinbelow with reference to FIG. 5.

In this embodiment, the irradiation field recognizing circuit 220 in the radiation image recording and reproducing system as shown in FIG. 1 extracts sample image signals at an arbitrary picture element string extending from an edge of the recording region on the stimulable phosphor sheet 103 towards the center thereof as indicated by the line X1—X1 in FIG. 2A, for example at a picture element string in the main scanning direction, from the overall preliminary read-out image signals Sp received from the A/D converter 211 in the same manner as mentioned above. As mentioned above, changes in image density d represented by the sample image signals thus extracted generally become as shown in FIG. 2B. FIG. 5 shows the changes in the image density d in the region outside of the irradiation field 103B. As shown in FIG. 5, the image density d changes comparatively moderately and linearly in the vicinity of the edge of the recording region, and increases sharply near the irradiation field 103B in the form approximately convex towards the low density side.

Figure 5:
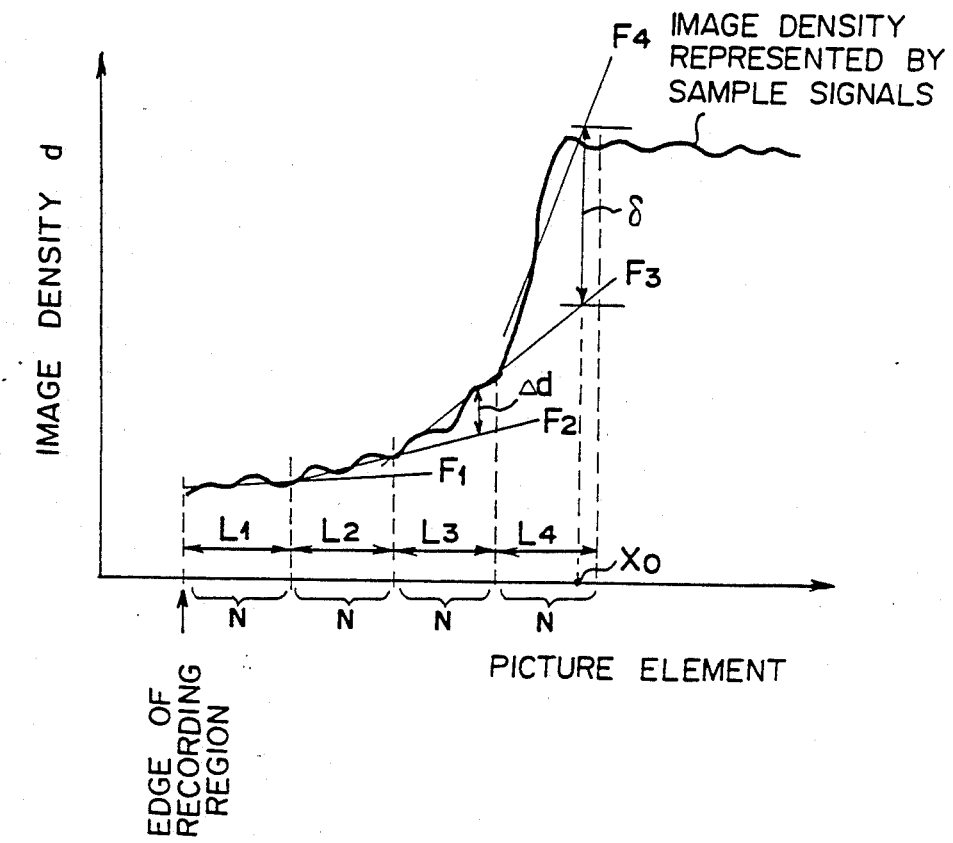
FIG. 5 is an explanatory graph showing recognition of the irradiation field in an embodiment of the second method of recognizing an irradiation field and in an embodiment of the second method of adjusting image processing conditions in accordance with the present invention.

As shown in FIG. 5, the irradiation field recognizing circuit 220 expresses the image density changes in picture element groups L1, L2, L3, ..., Ln, which comprise a predetermined N number of picture elements and are divided in the direction from the edge of the recording region 103A toward the center thereof, by approximate equations F1, F2, F3, ..., Fn respectively, constituted by a simple equation, for example, $y = ax + b$, by use of a known method. The approximate equations may also be any other equations of high order insofar as they substantially express a straight line.

The irradiation field recognizing circuit 220 then calculates differences between imaginary image density levels calculated by the approximate equations Fi and Fi-1 in the range of each picture element group Li wherein $2 \leq i \leq n$. For example, in the third picture element group L3 as counted from the edge side of the recording region 103A, a difference $\Delta d$ between an imaginary image density level calculated by the approximate equation F3 and an imaginary image density level calculated by extrapolation of the approximate equation F2 is calculated. Thereafter, the irradiation field recognizing circuit 220 compares the difference $\Delta d$ with the predetermined density difference $\delta$, starting from the picture element on the edge side of the recording region 103A. In each picture element group Li, the difference $\Delta d$ becomes larger at a picture element closer to the center side of the recording region 103A. However, in the next picture element group Li+1, the difference $\Delta d$ returns to a small value. Therefore, in the region in the vicinity of the edge of the recording region 103A, the difference $\Delta d$ does not become so large. However, as mentioned above, since the image density d increases sharply near the irradiation field 103B, the difference $\Delta d$ exceeds the predetermined density difference $\delta$ for the first time at the picture element XO at the edge portion of the irradiation field 103B. Therefore, the irradiation field recognizing circuit 220 recognizes the picture element XO, at which the image density difference $\Delta d$ comes to exceed the predetermined density difference $\delta$ for the first time in the aforesaid comparison, as an irradiation field edge picture element. The value suitable as the predetermined density difference $\delta$ may be selected experimentally. The aforesaid analysis is carried out also for the opposite edge portion of the recording region 103A, and irradiation field edge picture elements XO, XO as shown in FIG. 2A are detected for the picture element string X1—X1.

The irradiation field recognizing circuit 220 carries out the aforesaid analysis also, for example, for a picture element string X2—X2 parallel to the picture element string X1—X1, and picture element strings Y1—Y1 and Y2—Y2 which are normal to the picture element strings X1—X1 and X2—X2 as shown in FIG. 2A, and thereby detects other irradiation field edge picture elements XO and YO. The irradiation field recognizing circuit 220 recognizes the region outward from the irradiation field edge picture elements XO and YO as the region outside of the irradiation field, and the region inward from the irradiation field edge picture elements XO and YO as the irradiation field 103B, and sends the irradiation field signals St representing the irradiation field 103B to the control circuit 314 as mentioned above.

In the embodiment shown in FIG. 5, instead of making the region widths of the picture element groups L1, L2, L3, ..., Ln equal to one another and adjusting them to the N number of picture elements, the region widths may also be varied among the picture element groups. For example, the region widths may be adjusted to a function of the sequence i of each picture element group as counted from the sheet edge side. Suitable region widths may be selected experimentally. Also, the predetermined density difference $\delta$ which is to be compared with the density difference $\Delta d$ need not necessarily be fixed, and may be calculated as a function of the sequence i or the like.

An embodiment of the second method of adjusting image processing conditions in accordance with the present invention will now be described below.

As mentioned above with reference to the radiation image recording and reproducing system shown in FIG. 1, the method of adjusting image processing conditions in accordance with the present invention is applicable also to the case where the irradiation field is recognized from the preliminary read-out image signals and the image processing conditions are adjusted based on the preliminary read-out image signals inside of the recognized irradiation field. However, the embodiment described below is for the case where the irradiation field is recognized on the basis of final read-out image signals, and gradation processing conditions as one kind of the image processing conditions are adjusted based on the final read-out image signals inside of the recognized irradiation field.

In this embodiment, the image signals are obtained by carrying out the final read-out on the stimulable phosphor sheet carrying a radiation image stored thereon by limitation of the irradiation field.

Then, sample image signals at an arbitrary picture element string extending from an edge of a recording region on the stimulable phosphor sheet towards the center thereof are extracted from the image signals obtained in the manner as mentioned above. Changes among image density levels represented by the sample image signals are expressed by approximate equations F1, F2, F3, ..., Fn, which are substantially constituted by a simple equation for picture element groups L1, L2, L3, ..., Ln respectively, divided sequentially in a direction from the edge of the recording region towards the center of the recording region. Within a range of a picture element group Li wherein $2 \leq i \leq n$, differences between imaginary image density levels calculated respectively by use of the approximate equations Fi and Fi-1 are calculated. Then, a region extending up to a picture element, at which the difference comes up to a predetermined value, from the edge of the recording region towards the center thereof is recognized as a region outside of the irradiation field, and a region inward from said picture element as viewed in the direction from the edge of the recording region towards the center thereof is recognized as the irradiation field.

The method of recognizing the irradiation field utilized in this embodiment is the same as the aforesaid second method of recognizing an irradiation field in accordance with the present invention.

Then, the gradation processing conditions are adjusted on the basis of the image signals inside of the recognized irradiation field in the final read-out image signals detected from the recording medium. The adjustment may be carried out in various manners, for example in the manner as mentioned above with reference to FIG. 4.

An embodiment of the third method of recognizing an irradiation field in accordance with the present invention will hereinbelow be described with reference to FIG. 6. As in the case of FIG. 5, FIG. 6 shows changes in the image density d at the region outside of the irradiation field along the picture element string X1—X1 as shown in FIG. 2A.

Figure 6:
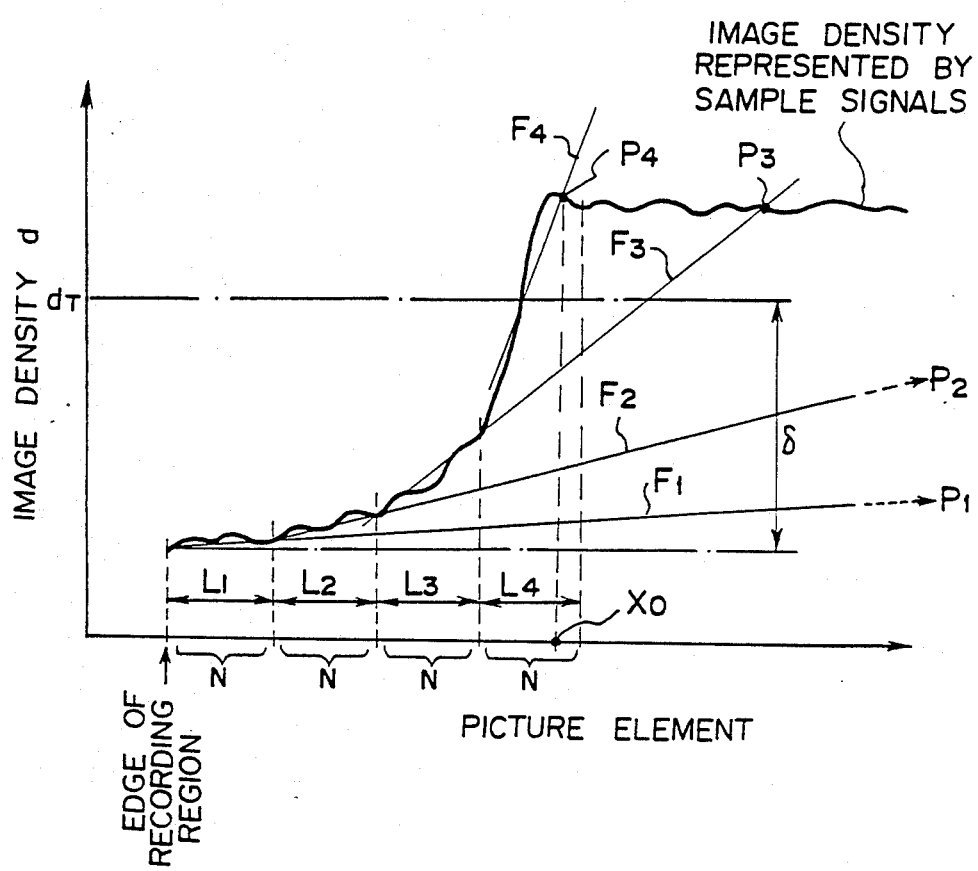
FIG. 6 is an explanatory graph showing recognition of the irradiation field in an embodiment of the third method of recognizing an irradiation field and in an embodiment of the third method of adjusting image processing conditions in accordance with the present invention.

As shown in FIG. 6, the irradiation field recognizing circuit 220 in the radiation image recording and reproducing system as shown in FIG. 1 expresses the image density changes in picture element groups L1, L2, L3, ..., Ln, which comprise a predetermined N number of picture elements and are divided in the direction from the edge of the recording region 103A toward the center thereof by approximate equations F1, F2, F3, ..., Fn respectively, constituted by a simple equation, for example $y = ax + b$, by use of a known method in the same manner as the embodiment shown in FIG. 5.

The irradiation field recognizing circuit 220 then detects intersecting points P1, P2, P3, ..., Pn of straight lines represented by the approximate equations F1, F2, F3, ..., Fn and an image density change curve represented by the sample image signals. In this case, the range of the image density change curve is limited to the range above a predetermined density dT, for example to the range above the image density d higher by a predetermined value δ than the image density at the picture element at the edge of the recording region 103A. Therefore, intersecting points of the respective straight lines and the image density change curve in the range near the edge of the recording region 103A, which indicates the amounts of scattered radiation, are not detected, and the intersecting points of the aforesaid straight lines and the image density change curve in the range representing the image inside of the irradiation field are detected, one for each straight line. The value suitable as the predetermined value δ may be selected experimentally.

Thereafter, the irradiation field recognizing circuit 220 judges the picture element X0 corresponding to the intersecting point (P4 in this embodiment) nearest to the edge of the recording region 103A among the intersecting points P1, P2, P3, ..., Pn as the irradiation field edge picture element. Specifically, since the image density d sharply increases in a form approximately convex towards the low density side at picture elements closer to the irradiation field 103B, the intersecting point nearest to the edge of the recording region 103A is present at the edge portion of the irradiation field 103B. The aforesaid analysis is carried out also for the opposite edge portion of the recording region 103A, and irradiation field edge picture elements X0, X0 as shown in FIG. 2A are detected for the picture element string X1—X1.

The irradiation field recognizing circuit 220 carries out the aforesaid analysis also, for example, for a picture element string X2—X2 parallel to the picture element string X1—X1, and picture element strings Y1—Y1 and Y2—Y2 which are normal to the picture element strings X1—X1 and X2—X2 as shown in FIG. 2A, and thereby detects other irradiation field edge picture elements X0 and Y0. The irradiation field recognizing circuit 220 recognizes the region outward from the irradiation field edge picture elements X0 and Y0 as the region outside of the irradiation field, and the region inward from the irradiation field edge picture elements X0 and Y0 as the irradiation field 103B, and sends the irradiation field signals St representing the irradiation field 103B to the control circuit 314 as mentioned above.

Also in the embodiment shown in FIG. 6, the region widths of the picture element groups L1, L2, L3, ..., Ln may be varied in the manner mentioned with reference to the embodiment shown in FIG. 5.

An embodiment of the third method of adjusting image processing conditions in accordance with the present invention will now be described below.

The embodiment described below is for the case where the irradiation field is recognized on the basis of final read-out image signals, and gradation processing conditions as one kind of the image processing conditions are adjusted based on the final read-out image signals inside of the recognized irradiation field.

In this embodiment, the image signals are obtained by carrying out the final read-out on the stimulable phosphor sheet carrying a radiation image stored thereon by limitation of the irradiation field.

Then, sample image signals at an arbitrary picture element string extending from an edge of a recording region on the stimulable phosphor sheet towards the center thereof are extracted from the image signals obtained in the manner mentioned above. Changes among image density levels represented by the sample image signals are expressed by approximate equations F1, F2, F3, ..., Fn, which are substantially constituted by a simple equation for picture element groups L1, L2, L3, ..., Ln respectively, divided sequentially in a direction from the edge of the recording region towards the center of the recording region. In the case where intersecting points of straight lines represented by the approximate equations F1, F2, F3, ..., Fn and an image density change curve in a range higher than a predetermined density level, which is represented by the sample image signals, are expressed as P1, P2, P3, ..., Pn respectively, a region on a sheet center side with respect to the intersecting point nearest to the edge of the recording region among the intersecting points P1, P2, P3, ..., Pn is recognized as the irradiation field.

The method of recognizing the irradiation field utilized in this embodiment is the same as the aforesaid third method of recognizing an irradiation field in accordance with the present invention.

Then, the gradation processing conditions are adjusted on the basis of the image signals inside of the recognized irradiation field in the final read-out image signals detected from the recording medium. The adjustment may be carried out in various manners, for example in the manner mentioned above with reference to FIG. 4.

We claim:

1. A method of recognizing an irradiation field wherein an irradiation field is recognized in a case where a radiation image is recorded on a recording medium by limitation of the irradiation field, the method of recognizing an irradiation field comprising the steps of:
   (i) extracting sample image signals at an arbitrary picture element string, which extends from an edge of a recording region on said recording medium towards the center of said recording region, from image signals detected from said recording medium,
   (ii) expressing changes among image density levels at a predetermined number of picture elements in the vicinity of said edge of said recording region, which image density levels are represented by said sample image signals, by an approximate equation substantially constituted by a simple equation,
   (iii) calculating differences between imaginary image density levels calculated by use of said approximate equation and actual image density levels represented by said sample image signals, and
   (iv) recognizing a region extending up to a picture element, at which said difference comes up to a predetermined value, from said edge of said recording region towards the center of said recording region as a region outside of the irradiation field, and recognizing a region inward from said picture element as viewed in the direction from said edge of said recording region towards the center of said recording region as the irradiation field.

2. A method of recognizing an irradiation field as defined in claim 1 wherein said recording medium is a stimulable phosphor sheet, and said image signals are detected from said stimulable phosphor sheet carrying the radiation image stored thereon by exposing said stimulable phosphor sheet to stimulating rays which cause it to emit light in proportion to the stored radiation energy.

3. A method of recognizing an irradiation field as defined in claim 1 wherein said stimulating rays are a laser beam.

4. A method of adjusting image processing conditions in the case where image signals detected from a recording medium carrying a radiation image stored thereon by limitation of an irradiation field are processed, the method of adjusting image processing conditions comprising the steps of:
   (i) extracting sample image signals at an arbitrary picture element string, which extends from an edge of a recording region on said recording medium towards the center of said recording region, from image signals detected from said recording medium,
   (ii) expressing changes among image density levels at a predetermined number of picture elements in the vicinity of said edge of said recording region, which image density levels are represented by said sample image signals, by an approximate equation substantially constituted by a simple equation,
   (iii) calculating differences between imaginary image density levels calculated by use of said approximate equation and actual image density levels represented by said sample image signals,
   (iv) recognizing a region extending up to a picture element, at which said difference comes up to a predetermined value, from said edge of said recording region towards the center of said recording region as a region outside of the irradiation field, and recognizing a region inward from said picture element as viewed in the direction from said edge of said recording region towards the center of said recording region as the irradiation field, and
   (v) adjusting said image processing conditions on the basis of the image signals inside of said recognized irradiation field in said image signals detected from said recording medium.

5. A method of adjusting image processing conditions as defined in claim 4 wherein said recording medium is a stimulable phosphor sheet, and said image signals are detected from said stimulable phosphor sheet carrying the radiation image stored thereon by exposing said stimulable phosphor sheet to stimulating rays which cause it to emit light in proportion to the stored radiation energy.

6. A method of adjusting image processing conditions as defined in claim 4 wherein said stimulating rays are a laser beam.

7. A method of adjusting image processing conditions as defined in claim 4 wherein said image processing conditions are gradation processing conditions, and said gradation processing conditions are adjusted by:
   (a) determining a histogram of said image signals inside of said irradiation field, (b) calculating the maximum image signal level Pmax and the minimum image signal level Pmin of a desired image signal range in said histogram, and (c) adjusting said gradation processing conditions so that the maximum image signal level Pmax and the minimum image signal level Pmin correspond respectively to the maximum signal level Rmax and the minimum signal level Rmin of a desired input signal range in an image reproduction means which are determined by the maximum density Dmax and the minimum density Dmin of a correct density range in a reproduced visible image.

8. A method of recognizing an irradiation field wherein an irradiation field is recognized in the case where a radiation image is recorded on a recording medium by limitation of the irradiation field, the method of recognizing an irradiation field comprising the steps of:

(i) extracting sample image signals at an arbitrary picture element string, which extends from an edge of a recording region on said recording medium towards the center of said recording region, from image signals detected from said recording medium, (ii) expressing changes among image density levels represented by said sample image signals by approximate equations F1, F2, F3, ..., Fn, which are substantially constituted by a simple equation, respectively for picture element groups L1, L2, L3, ..., Ln divided sequentially in a direction from said edge of said recording region towards the center of said recording region, (iii) calculating differences between imaginary image density levels calculated by use of said approximate equations Fi and Fi-1 respectively within a range of a picture element group Li wherein $2 \leq i \leq n$, and (iv) recognizing a region extending up to a picture element, at which said difference comes up to a predetermined value, from said edge of said recording region towards the center of said recording region as a region outside of the irradiation field, and recognizing a region inward from said picture element as viewed in the direction from said edge of said recording region towards the center of said recording region as the irradiation field.

9. A method of recognizing an irradiation field as defined in claim 8 wherein said recording medium is a stimulable phosphor sheet, and said image signals are detected from said stimulable phosphor sheet carrying the radiation image stored thereon by exposing said stimulable phosphor sheet to stimulating rays which cause it to emit light in proportion to the stored radiation energy.

10. A method of recognizing an irradiation field as defined in claim 8 wherein said stimulating rays are a laser beam.

11. A method of adjusting image processing conditions in the case where image signals detected from a recording medium carrying a radiation image stored thereon by limitation of an irradiation field are processed, the method of adjusting image processing conditions comprising the steps of:

(i) extracting sample image signals at an arbitrary picture element string, which extends from an edge of a recording region on said recording medium towards the center of said recording region, from image signals detected from said recording medium, (ii) expressing changes among image density levels represented by said sample image signals by approximate equations F1, F2, F3, ..., Fn, which are substantially constituted by a simple equation for picture element groups L1, L2, L3, ..., Ln respectively, divided sequentially in a direction from said edge of said recording region towards the center of said recording region, (iii) calculating differences between imaginary image density levels calculated by use of said approximate equations Fi and Fi-1 respectively within a range of a picture element group Li wherein $2 \leq i \leq n$, (iv) recognizing a region extending up to a picture element, at which said difference comes up to a predetermined value, from said edge of said recording region towards the center of said recording region as a region outside of the irradiation field, and recognizing a region inward from said picture element as viewed in the direction from said edge of said recording region towards the center of said recording region as the irradiation field, and (v) adjusting said image processing conditions on the basis of the image signals inside of said recognized irradiation field in said image signals detected from said recording medium.

12. A method of adjusting image processing conditions as defined in claim 11 wherein said recording medium is a stimulable phosphor sheet, and said image signals are detected from said stimulable phosphor sheet carrying the radiation image stored thereon by exposing said stimulable phosphor sheet to stimulating rays which cause it to emit light in proportion to the stored radiation energy.

13. A method of adjusting image processing conditions as defined in claim 11 wherein said stimulating rays are a laser beam.

14. A method of adjusting image processing conditions as defined in claim 11 wherein said image processing conditions are gradation processing conditions, and said gradation processing conditions are adjusted by:

(a) determining a histogram of said image signals inside of said irradiation field, (b) calculating the maximum image signal level Pmax and the minimum image signal level Pmin of a desired image signal range in said histogram, and (c) adjusting said gradation processing conditions so that the maximum image signal level Pmax and the minimum image signal level Pmin correspond to the maximum signal level Rmax and the minimum signal level Rmin respectively of a desired input signal range in an image reproduction means which are determined by the maximum density Dmax and the minimum density Dmin of a correct density range in a reproduced visible image.

15. A method of recognizing an irradiation field wherein an irradiation field is recognized in the case where a radiation image is recorded on a recording medium by limitation of the irradiation field, the method of recognizing an irradiation field comprising the steps of:

(i) extracting sample image signals at an arbitrary picture element string, which extends from an edge of a recording region on said recording medium towards the center of said recording region, from image signals detected from said recording medium, (ii) expressing changes among image density levels represented by said sample image signals by approximate equations F1, F2, F3, ..., Fn, which are substantially constituted by a simple equation for picture element groups L1, L2, L3, ..., Ln respectively, divided sequentially in a direction from said edge of said recording region towards the center of said recording region, and (iii) expressing intersecting points of straight lines represented by said approximate equations F1, F2, F3, ..., Fn and an image density change curve in a range higher than a predetermined density level, which is represented by said sample image signals as P1, P2, P3, ..., Pn respectively, and recognizing a region on a sheet center side with respect to the intersecting point nearest to said edge of said recording region among said intersecting points P1, P2, P3, ..., Pn as the irradiation field.

16. A method of recognizing an irradiation field as defined in claim 15 wherein said recording medium is a stimulable phosphor sheet, and said image signals are detected from said stimulable phosphor sheet carrying the radiation image stored thereon by exposing said stimulable phosphor sheet to stimulating rays which cause it to emit light in proportion to the stored radiation energy.

17. A method of recognizing an irradiation field as defined in claim 15 wherein said stimulating rays are a laser beam.

18. A method of adjusting image processing conditions in the case where image signals detected from a recording medium carrying a radiation image stored thereon by limitation of an irradiation field are processed, the method of adjusting image processing conditions comprising the steps of:

(i) extracting sample image signals at an arbitrary picture element string, which extends from an edge of a recording region on said recording medium towards the center of said recording region, from image signals detected from said recording medium, (ii) expressing changes among image density levels represented by said sample image signals by approximate equations F1, F2, F3, ..., Fn, which are substantially constituted by a simple equation for picture element groups L1, L2, L3, ..., Ln respectively, divided sequentially in a direction from said edge of said recording region towards the center of said recording region, (iii) expressing intersecting points of straight lines represented by said approximate equations F1, F2, F3, ..., Fn and an image density change curve in a range higher than a predetermined density level, which is represented by said sample image signals as P1, P2, P3, ..., Pn respectively, and recognizing a region on a sheet center side with respect to the intersecting point nearest to said edge of said recording region among said intersecting points P1, P2, P3, ..., Pn as the irradiation field, and (iv) adjusting said image processing conditions on the basis of the image signals inside of said recognized irradiation field in said image signals detected from said recording medium.

19. A method of adjusting image processing conditions as defined in claim 18 wherein said recording medium is a stimulable phosphor sheet, and said image signals are detected from said stimulable phosphor sheet carrying the radiation image stored thereon by exposing said stimulable phosphor sheet to stimulating rays which cause it to emit light in proportion to the stored radiation energy.

20. A method of adjusting image processing conditions as defined in claim 18 wherein said stimulating rays are a laser beam.

21. A method of adjusting image processing conditions as defined in claim 18 wherein said image processing conditions are gradation processing conditions, and said gradation processing conditions are adjusted by:

(a) determining a histogram of said image signals inside of said irradiation field, (b) calculating the maximum image signal level Pmax and the minimum image signal level Pmin of a desired image signal range in said histogram, and (c) adjusting said gradation processing conditions so that the maximum image signal level Pmax and the minimum image signal level Pmin correspond to the maximum signal level Rmax and the minimjum signal level Rmin respectively of a desired input signal range in an image reproduction means which are determined by the maximum density Dmax and the minimum density Dmin of a correct density range in a reproduced visible image.

* * * * *